UNITED STATES PATENT OFFICE.

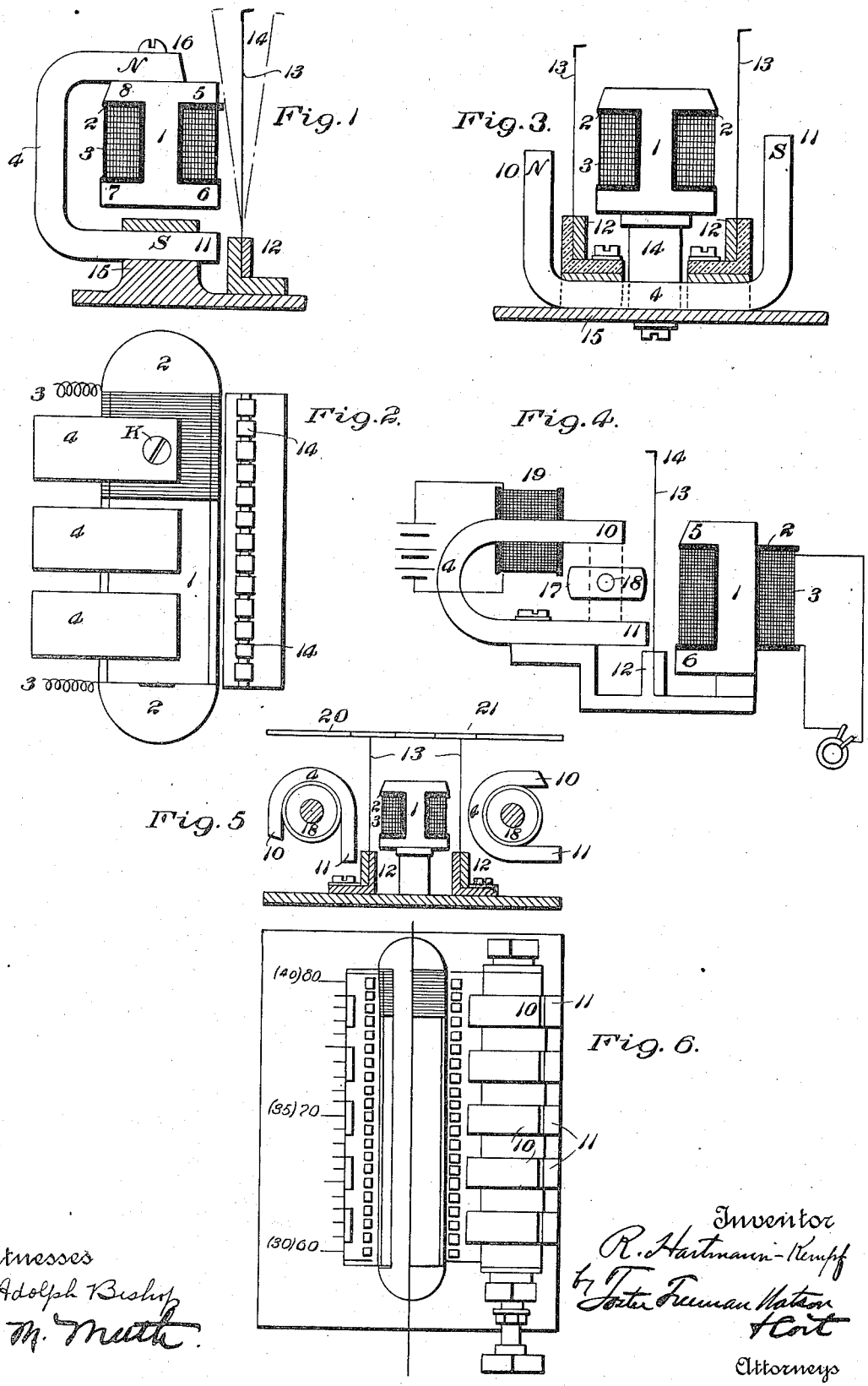

ROBERT HARTMANN-KEMPF, OF FRANKFORT-ON-THE-MAIN, GERMANY, ASSIGNOR TO THE FIRM OF HARTMANN & BRAUN ACTIEN-GESELLSCHAFT, OF FRANKFORT-ON-THE-MAIN, GERMANY.

FREQUENCY-MEASURING INSTRUMENT.

996,713. Specification of Letters Patent. Patented July 4, 1911.

Application filed May 31, 1907. Serial No. 376,553.

*To all whom it may concern:*

Be it known that I, ROBERT HARTMANN-KEMPF, a subject of the German Emperor, and a resident of Frankfort-on-the-Main, Germany, have invented certain new and useful Improvements in Frequency-Measuring Instruments, of which the following is a specification.

My invention relates to improvements in alternating current frequency measuring instruments, and more particularly to that class of instruments, in which the current impulses vibrate resounding bodies, such as tongues or reeds, each of which is tuned to vibrations of a certain periodicity. An example of an instrument of this class is described in my German Patent No. 114565. It consists of an electric coil adapted to be energized by the alternating current the frequency of which is to be determined. In front of said coil a set of metallic tongues or reeds is arranged each of which is tuned to respond to a certain frequency. Now, each change of polarity exerts a magnetic attraction on the tongues. The latter must therefore be tuned to so many vibrations, as changes of polarity are intended to be measured. However, with a frequency of the alternating current of 60 periods, corresponding to 120 changes of polarity of the electric coil, a tongue tuned to 120 vibrations is required, which tongue is very short, so that the representation of the frequency by said tongue, that is the amplitude of the vibrations of the tongue, is very small. To obtain the representations at a larger scale, I have indicated, in my German patent referred to, a means, whereby the frequency of alternating currents of high periodicity can be measured by means of tongues tuned to half the number of vibrations. The said means consists of a coil energized by direct current and adapted to counteract in the electromagnet, the effect of the alternating current impulses of one direction and to increase that of the impulses of the other direction, whereby the electromagnet has always the same polarity, its force of attraction varying from a maximum to zero. The frequency of these variations is only one half of that of the alternating current. By the arrangement described the size of the representation of the frequency is increased, and also the range of a measuring instrument. For example, by means of a set of 31 tongues tuned to respond to changes of polarity of from 30 to 60, also changes of from 60 to 120 can be measured, when using the direct current electromagnet. This arrangement may be called transposition of the range of measurement. However in many cases it is inconvenient to use direct current to effect this transposition. Therefore I have now designed a new means to effect this transposition, which means consists in substituting the electromagnet by a permanent magnet. However the ordinary means to polarize alternating currents by means of a permanent electromagnet have proved unsatisfactory. For example, when using the system known in telephony for polarizing the current impulses passing through the receiver, in which system the current impulses pass around the pole of a permanent magnet, the field of the magnet will be weakened by strong alternating currents, unless large magnets are used, and furthermore the pole ends are heated.

An important feature of my invention consists in so arranging the permanent magnet and the alternating current coil, that the said disadvantages are avoided.

A further feature of the invention consists in combining means with the permanent magnet, whereby the latter can be thrown out of operation.

In the accompanying drawing I have illustrated several examples of my improved instrument, which will explain the invention.

In said drawing—Figure 1, is a cross-section of an example of the apparatus, Fig. 2, is a plan of the example shown in Fig. 1, Fig. 3, is a cross-section of a further example, Fig. 4, is a cross-section of a further example showing, in addition, means to throw the permanent magnet temporarily out of operation, Fig. 5, is a cross-section of an example similar to that of Fig. 3, and showing, in addition, a further example of means to throw the permanent magnet temporarily out of operation, and Fig. 6, is a plan of Fig. 5.

Similar letters of reference refer to similar parts throughout the views.

Referring particularly to the example shown in Figs. 1 and 2, a laminated iron core 1 of an electromagnet carries a bobbin 2 and its wire coil 3. A set of permanent magnets 4 are arranged to embrace the electromagnet, an air gap being provided between each of the permanent magnets and the electromagnet. The core 1 is secured to the pole ends of the magnets 4 by means of screws 16, and the magnets are mounted on a common base 15. The core 1 is provided at its upper and lower part with lateral extensions 5, 8 and 6, 7 respectively. In front of the extensions 5 and 6 a set of tongues or reeds 13 of magnetic material are mounted on the base 15 to which they are rigidly secured between an angle piece and a plate 12. The lower pole of the permanent magnet extends preferably within a short distance from said tongues 13. The latter are provided, at their upper ends, with small vanes or the like.

The alternating magnetic circuit passes principally over the extensions 5 and 6 of core 1, while a part thereof passes over the extension 7 and 8. On account of the air gap the permanent magnet can not possibly be demagnetized, and the magnet circuit of the permanent magnet is forced to pass through the electromagnet as well as through the tongues in front of the latter.

The number of the tongues provided in my apparatus corresponds to the range of the frequencies of the alternating currents to be measured, and each tongue is designed to indicate a certain frequency. For this purpose the tongues are successively tuned to an increasing pitch, and the frequency of the natural vibration of each tongue corresponds to a certain frequency of the alternating current, or rather to one half of it, on account of the effect of the permanent magnets. A current of a certain frequency will therefore vibrate a definite tongue the natural vibration of which responds to the frequency of the current. The remaining tongues however will not, or hardly perceivably be vibrated.

It is not necessary to have the permanent magnets arranged along the whole set of tongues, but between consecutive magnets a space may be left about equal to the breadth of a magnet; for the magnetic field will notwithstanding be uniformly distributed over all the tongues.

The operation of the apparatus is as follows: The coil 3 of the electromagnet is included in the circuit of the alternating current the frequency of which is to be determined. The positive and negative current impulses of each period of the alternating current will cause a magnetic flux successively to pass in opposite directions through the core 1, the polar extensions 5 and 6 of the latter, and the tongues 13 of magnetic material. Therefore, if the permanent magnet 4 were not provided, the polarity of the electromagnet would twice be changed for each period of the current, and each change of polarity would cause a slight force of attraction to be exerted on the tongues. However, as the magnetic flux of one direction is counteracted by the permanent flux of the magnet 4, said force of attraction will but once be exerted on the tongues for each period of the current. The said force will have hardly any effect on most of the tongues; but that tongue in which the frequency of the natural vibration is equal to that of the changes of polarity will be oscillated, whereby the said frequency is determined. It may be stated here, that also the neighboring tongues, the pitch of which is slightly higher or lower, will be oscillated, but to a smaller degree. These oscillations provide a means to determine the frequency with more accuracy. For if the amplitudes of the neighboring tongues are equal, it may be concluded, that the frequency of the current is exactly that indicated by the tongue. If however the amplitude of one of the neighboring is somewhat larger, than that of the other one, this fact will indicate, that the frequency of the current is not exactly that of the intermediate tongue, but between that of the latter and that of the neighboring tongue of larger amplitude.

In Fig. 3 I have shown a second example of my improved apparatus. In this example, the electromagnet as well as the tongues are arranged between the poles of the permanent magnet. The electromagnet 1 is supported on suitable brackets 14, arranged on a base 15. The latter also supports the U-shaped permanent magnet 4 the poles of which extend vertically therefrom. Between said poles and the pole extensions of the core 1, and on both sides of the latter, a set of tongues 13 is mounted the lower ends of which are supported on the base 15, as in the example shown in Fig. 1. The tongues, in this example, are shown as of different lengths, according to the different pitch thereof.

Practical experiments have shown, that also in this case the impulses of the alternating current are affected in the same way, as in the example shown in Fig. 1. The operation of the device is the same as that of Fig. 1, and it will readily be understood from the description thereof given with reference to said figure.

It is obvious, that the shape of the magnet and its arrangement relatively to the electromagnets may be modified without departing from my invention; and I wish it to be understood, that the construction shown and described are merely examples illustrating the invention. Under certain circumstances it will be advisable to strengthen the permanent magnets in case their magnetism should be weakened by improper treatment (see Fig. 4).

In cases where the range of the measurements is very large, I find it advisable to make provisions in my apparatus, whereby the latter may be used either transposed, as described above, or direct. For this purpose, it is necessary to provide means, whereby the permanent magnet is temporarily thrown out of operation. To effect this, several means may be provided. For example, the permanent magnets may be entirely removed, or they may be located relatively to the electromagnet in such a way as not to exert any influence on the latter, or their magnetic circuits may be shortcircuited. To illustrate what may be done in this connection, I have shown two examples in Figs. 4 to 6.

In the example, shown in Fig. 4 the set of tongues 14 is arranged between the magnet 4, provided with a direct current coil 19, and the alternating current electromagnet 1, 3. Between the pole ends 10 and 11, I provide an armature 17 pivotally supported at 18. As long as the said armature is in the position shown in full lines, the permanent magnet is operative to polarize the electromagnet 1, 5, 6. But when it is turned about its pivot 18 into the position shown in dotted lines, the magnetic circuit of the magnet 4 will no longer pass through the tongues 13, but directly through the armature 17. The tongues will therefore respond to impulses of the double frequency.

Another example, how the magnet may be rendered inoperative is shown in Figs. 5 and 6. The magnets 4 are mounted on shafts 18, which can be rotated. When the magnets are in the position shown at the right side in Fig. 5, they will be inoperative; but when they are in the position shown at the left side of said figure, they will be operative. Figs. 5 and 6 also illustrate a suitable way of arranging a scale adjacent to the free ends of the tongues. The said scale is provided along the ends of the tongues and on a plate 20 arranged above the latter and provided with apertures 21 through which the ends of the tongues or the vanes 14 may be observed. The numbers at the side of the scale give the frequency of the current, those shown in parenthesis indicating the frequency when the magnets 4 are inoperative.

I claim:

1. In an instrument for measuring the frequency of an alternating electric current, the combination, with an electromagnet adapted to be energized by the alternating current, of a plurality of resounding bodies in front of the poles of said electromagnet and adapted to be vibrated thereby, each of said resounding bodies being tuned to a certain natural vibration, and a permanent magnet exerting a constant force of attraction on said resounding bodies and counteracting the pull tending to move said bodies exerted by the magnetic impulses of one direction, a space of high magnetic resistance being provided between said permanent magnet and said electromagnet.

2. In a frequency measuring instrument, the combination, with means to produce alternating magnetic impulses, of a resounding body exposed to said magnetic impulses and responding to impulses of a certain frequency, a permanent magnet counteracting the magnetic impulses of one direction, and means to throw said permanent magnet out of operation.

3. In an instrument for measuring the frequency of an alternating electric current, the combination, with an electromagnet adapted to be energized by the alternating current, of a plurality of resounding bodies in front of the poles of said electromagnet and adapted to be vibrated thereby, each of said resounding bodies being turned to a certain natural vibration, and a plurality of permanent magnets exerting a constant force of attraction on said resounding bodies and counteracting the pull tending to move said bodies exerted by the magnetic impulses of one direction, a space of high magnetic resistance being provided between said permanent magnets and said electromagnet.

4. In an instrument for measuring the frequency of an alternating electric current, the combination, with an electromagnet adapted to be energized by the alternating current, of a plurality of resounding bodies in front of the poles of said electromagnet and adapted to be vibrated thereby, each of said resounding bodies being tuned to a certain natural vibration, and a plurality of permanent magnets arranged within a certain distance from one another and exerting a constant force of attraction on said resounding bodies and counteracting the pull tending to move said bodies exerted by the magnetic impulses of one direction, a space of high magnetic resistance being provided between said permanent magnets and said electromagnet.

5. In a frequency measuring instrument, the combination, with means to produce alternating magnetic impulses, of a resounding body exposed to said magnetic impulses and responding to impulses of a certain frequency, a permanent magnet counteracting the magnetic impulses of one direction, a direct current coil on said permanent magnet, and means to energize said direct current coil.

In testimony whereof I have signed my name to this specification in the presence of two subscribing witnesses.

ROBERT HARTMANN-KEMPF.

Witnesses:
 ERWIN DIPPEL,
 MICHAEL VOLKE.